Patented May 2, 1933

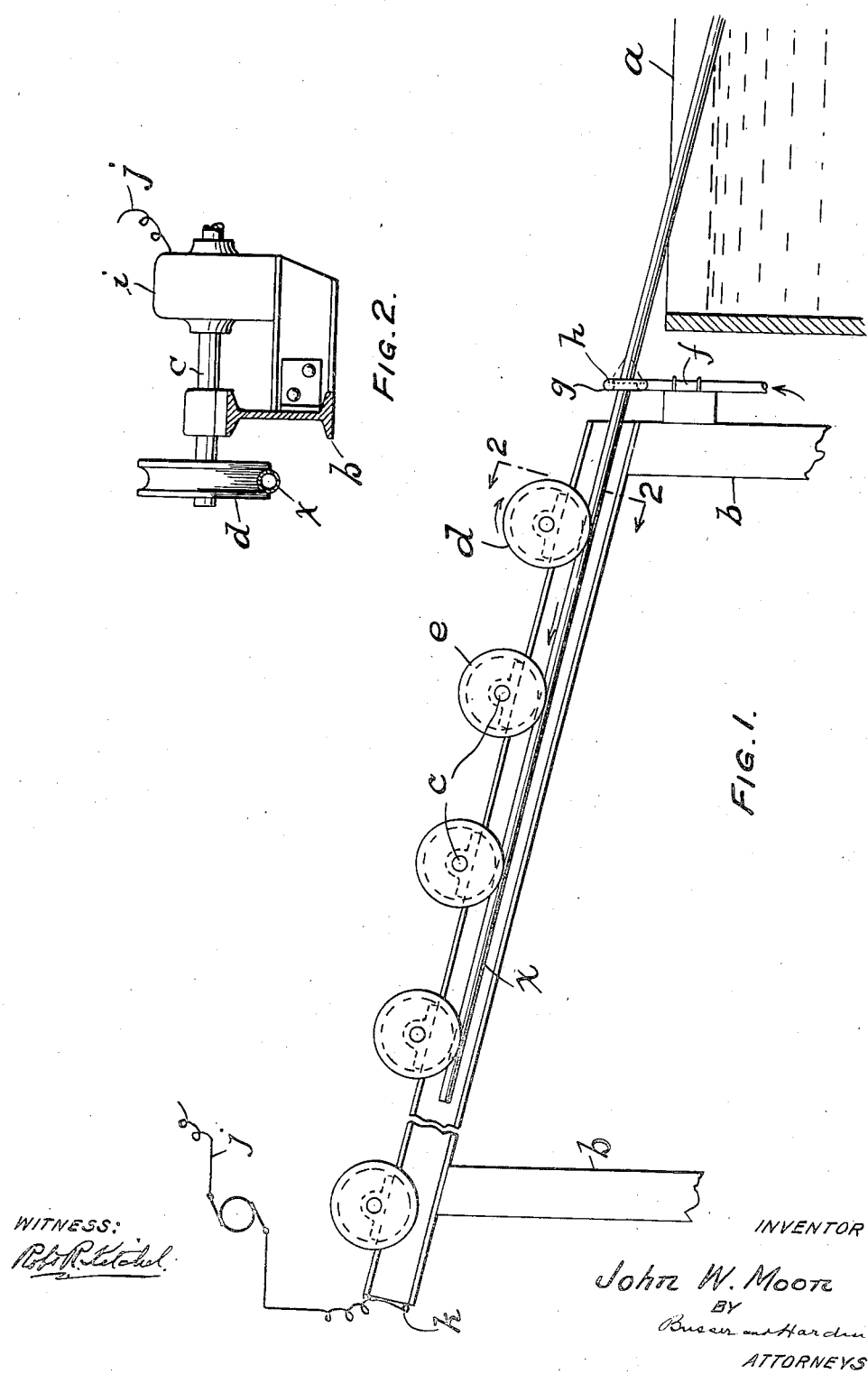

1,906,400

UNITED STATES PATENT OFFICE

JOHN W. MOON, OF BUTLER, PENNSYLVANIA, ASSIGNOR, BY DIRECT AND MESNE ASSIGNMENTS, TO FRETZ-MOON TUBE COMPANY, INC., OF BUTLER, PENNSYLVANIA, A CORPORATION OF PENNSYLVANIA

APPARATUS AND PROCESS FOR CONVEYING COATED ARTICLES FROM A GALVANIZING TANK

Application filed December 7, 1928. Serial No. 324,466.

The object of my invention is to provide improved mechanism for conveying pipes, tubes, rods, bars, etc., from the galvanizing tank to the desired point of delivery.

An apparatus showing the invention in a preferred form is disclosed in the drawing, wherein Fig. 1 is a side elevation of the machine and Fig. 2 a detail view showing one of the transporting rolls in end view.

Beyond a tank $a$, containing the hot metal with which the pipes, tubes, rods or bars are coated, is a frame $b$, on which are supported the shafts $c$ of a series of rollers $d$, $e$, etc., which are grooved or otherwise shaped to best adapt them to receive and convey away the pipes or other articles as they are removed from the tank. One or more of these rolls, preferably the first two of the series, are magnetized in order that the pipes, when fed to the rolls, will be supported thereby.

Positioned on the frame $b$, between the tank $a$ and the first roll $d$ of the series, is a bracket $f$ carrying a ring $g$. The bracket and ring are both preferably hollow and the ring is provided with a series of perforations $h$ which open rearwardly.

On the shaft of each roll that is magnetized is the field winding $i$ in an electric circuit $j$ in which is a switch $k$, whereby the circuit may be opened or closed and the rolls $d$, $e$ magnetized or de-magnetized at will.

The operator, by any means, including means known in the art, grips one end of a pipe $x$ that is immersed in the tank and pushes it through the ring $g$ into contact with the bottom of roller $d$, which is preferably a positively driven roll. The magnetized roller immediately grips and supports and positively conveys the pipe forward until it contacts with the bottom of roller $e$, which is likewise preferably positively driven and magnetized. After the forward end of the pipe contacts with roller $e$, the two rollers $d$ and $e$ not only positively convey the pipe, but they position the pipe so that it is maintained in about the center of the ring $g$, and thereafter the pipe requires no guidance on the part of the operator.

At any time after the rear end of the pipe has passed through the ring $g$, the rolls $d$ and $e$ may be de-magnetized and the pipe will immediately fall.

Many variations of the described arrangement are permissible. Thus, the rolls $d$ and $e$ may be permanently magnetized and the pipe may be supported at its forward end after the rear end thereof moves beyond roller $d$, and when the rear end of the pipe reaches the roller $e$, the pipe may be pulled beyond it and allowed to drop. Any other of the rollers, as, for example, the last roller of the series may be magnetized, so that, when the rear end of the pipe reaches roller $d$, or passes beyond roller $d$, it will be supported at opposite ends just before the rollers are de-magnetized. It is preferred, however, to render only rollers $d$ and $e$ magnetic and to de-magnetize these rollers after the rear end of the pipe passes beyond the ring $g$.

The apparatus shown renders it unnecessary to support the moving pipe from beneath, but it is to be understood that the addition to the machine of such a support is not precluded.

Compressed air or other fluid is forced through the hollow bracket $f$ and ring $g$ and out the perforations $h$ onto the surface of the pipe during its travel from the tank so as to blow away the surplus metal from the pipe and give it a coating of uniform thickness throughout its length. This device forms the subject-matter of my separate application Serial No. 324,467, filed Dec. 7, 1928.

Having now fully described my invention, what I claim and desire to protect by Letters Patent is:

1. In an apparatus adapted to cooperate in the conveyance of elongated articles from a tank adapted to contain hot metal for coating such articles, the combination, with the tank, of a ring through which the forward end of the article, as it is lifted from the tank, may be directed, and a series of rollers arranged above a tangent common to their perpiheries and which aligns with a point within the ring, one or more of said rollers being magnetized.

2. The process of conveying articles of elongated contour from a tank in which said articles are coated with a metal, which comprises simultaneously conveying said articles and magnetically supporting them from above.

3. The process of conveying articles of elongated contour from a tank in which said articles are coated with a metal, which comprises simultaneously conveying said artles and magnetically supporting them from above, and subsequently releasing said articles by de-magnetizing their supporting means.

4. In an apparatus adapted to cooperate in the conveyance of elongated articles from a tank adapted to contain hot metal for coating such articles, the combination, with the tank, of rollers mounted to rotate about their own axes, said axes being fixed, the rollers being arranged in a series and with which the article emerging from the tank is adapted to successively engage, one or more of said rollers being magnetized and so positioned as to support the article beneath it during its travel.

5. In an apparatus adapted to cooperate in the conveyance of elongated articles from a tank adapted to contain hot metal for coating such articles, the combination, with the tank, of rollers mounted to rotate about their own axes, said axes being fixed, the rollers being arranged in a series and with which the article emerging from the tank is adapted to successively engage, one or more of said rollers being so positioned that the article travels beneath it, and means to magnetize and de-magnetize one or more of said so positioned rollers.

6. In an apparatus adapted to cooperate in the conveyance of elongated articles from a tank adapted to contain hot metal for coating such articles, the combination, with the tank, of a series of rollers mounted to rotate about their own axes, said axes being fixed, the rollers being arranged at successively higher elevations and under which the article taken from the tank is adapted to successively travel, and means to magnetize one or more of said rollers so as to support the article while it is traveling beneath the series of rollers.

In testimony of which invention, I have hereunto set my hand, at Butler, Pa., on this 3rd day of December, 1928.

JOHN W. MOON.